United States Patent [19]

Wycech

[11] Patent Number: 4,995,545

[45] Date of Patent: Feb. 26, 1991

[54] METHOD OF REINFORCING A STRUCTURE MEMBER

[75] Inventor: Joseph Wycech, Grosse Pointe Woods, Mich.

[73] Assignee: Essex Composite Systems, Roseville, Mich.

[21] Appl. No.: 282,531

[22] Filed: Dec. 12, 1988

Related U.S. Application Data

[62] Division of Ser. No. 166,282, Mar. 10, 1988.

[51] Int. Cl.⁵ .......................................... B29C 67/20
[52] U.S. Cl. ................................ 228/119; 29/402.13; 29/402.18; 29/458; 264/36; 264/46.6; 264/46.7; 264/DIG. 6; 264/DIG. 7; 264/DIG. 65; 521/54; 521/912
[58] Field of Search ...................... 264/46.6, 46.7, 36, 264/DIG. 6, 45.2, 45.4, DIG. 65, DIG. 7; 425/4 R; 521/54, 139, 912; 228/119; 29/402.13, 402.18, 402.01, 458, DIG. 48

[56] References Cited

U.S. PATENT DOCUMENTS

| | | | |
|---|---|---|---|
| 3,536,656 | 10/1970 | Sommer | 264/DIG. 6 |
| 3,608,010 | 9/1971 | Stayner | 264/51 |
| 4,250,136 | 2/1981 | Rex | 264/257 |
| 4,269,890 | 5/1981 | Breitling et al. | 264/45.2 |
| 4,572,856 | 2/1986 | Gembinski | 264/46.7 |
| 4,737,407 | 4/1988 | Wycech | 264/DIG. 6 |
| 4,751,249 | 6/1988 | Wycech | 264/45.4 |

FOREIGN PATENT DOCUMENTS

59-169833  9/1984  Japan .................................. 264/46.6

Primary Examiner—Jeffery Thurlow
Attorney, Agent, or Firm—Dykema Gossett

[57] ABSTRACT

A two-part for reinforcing a hollow strucutral members and its method of use are provided. A method of reinforcing a structural member having a hollow cavity comprises the steps of preparing a first dough which includes a thermal setting resin, a first filler and unexpanded, thermally-expandable microspheres. A further step includes preparing a second dough which includes a curing agent, a colorant and a second filler. The curing agent is compatible with the thermosetting resin to promoter cross-linking of the thermosetting resin upon contact with the curing agent. The hollow structural member may be preheated to enhance the rate at whcih the thermosetting resin cross-links. The two dough are blended together until a reactive third dough of substantially uniform mixture is formed. The uniformity of the blending is confirmed when the reactive third dough attains a uniform color intermediate the color between the colors of the first and second doughs. The blended reactive dough is then packed into the cavity of the cleaned structural member. The cavity is then preferably closed with a closure plate. As the curing agent promotes the cross-linking reaction of the thermosetting resin, the exothermic reaction generates heat which is transferred to the unexpanded, thermally-expandable microspheres, causing the microspheres to expand. The expansion of the microspheres causes the reactie dough to rise, substantially filling the cavity. As the reactive dough cures, it bonds rigidly to the surfaces whcih it contacts. The reactive dough is allowed to fully cure, whereupon a solid lightweight reinforcement member rigidly bonded to the structural member is formed.

15 Claims, 3 Drawing Sheets

METHOD OF REINFORCING A STRUCTURE MEMBER

This is a divisional of co-pending application Ser. No. 07/166,282 filed on Mar. 10, 1988.

FIELD OF THE INVENTION

The present invention relates generally to methods for reinforcing hollow structural members and more specifically deals with a two-part, resin-based system used in the method for reinforcing hollow structural members.

BACKGROUND OF THE INVENTION

Motor vehicle collisions are a common occurrence in today's highly mobile society. Motor vehicle designers and manufacturers go to great lengths to protect the vehicle occupants from injury by providing vehicle structures having good strength and energy absorption characteristics. It is also a goal of designers to fabricate motor vehicle structures which can withstand low-speed impacts without requiring substantial repairs. Although motor vehicle designers and manufacturers have succeeded in providing high-strength, energy-absorbing structural components, the restoration of these desirable attributes to a motor vehicle which has been damaged in a collision is of considerable concern to after-market vehicle repair facilities.

Particularly in the case of metal structural components, the deformation of a structural member during a collision produces a number of unwanted effects in terms of both the relative geometry or shape of the part and with respect to the strength of the metal. It is a goal of the repair facility to restore to the extent possible the original shape of the damaged part so that it can once again carry out its function in the vehicle. It is a further goal, however, of the repair facility to restore the original strength and energy absorption characteristics to the damaged part. While considerable attention has been paid to the restoration of shape in collision damage repair, resulting in numerous metal repair procedures and devices such as frame-straightening machines and the like, the viability of reinforcement techniques in collision repair are less developed. It will be appreciated that the feasibility of reinforcement devices and procedures is determined by a number of factors that go beyond merely restoring strength to the damaged part.

When a metal part is plastically deformed, the internal structure of the metal is changed. Thus, this type of deformation changes the properties of the metal. The original deformation of the metal structure during a collision as well as its restoration by metal repair straightening operations can be considered work-hardening. Work-hardening processes may cause brittleness of the work section due to strain-hardening and generally change the strength and energy absorption properties of the part. In many instances, for example, where frame damage has occurred resulting in a crumpled, bent or collapsed frame member, a new section of frame rail must be spliced into place. The new rail piece is commonly welded in place using arc or mig welding techniques. In order to reinforce the weld joints or to compensate for the altered compositional characteristics of a section of metal produced by cold-working, a metal plate is typically welded into the rail over the joint or worked region. This has been the traditional approach to reinforcing metal structures, and it has numerous drawbacks.

A metal plate must be cut to conform to the shape of the part to be repaired. It will be appreciated by those skilled in the art that in many motor vehicles, the vehicle frame comprises a pair of U-shaped pressings or stampings which are welded together by means of a horizontal longitudinal joint or seam and that each U-shaped pressing defines a channel. Although metal reinforcement plates are at times welded directly to the outside of the hollow rail beam, more often the spot welds connecting the two U-shaped pressings are bored out, and the more damaged stamping is removed to be replaced with a new piece. Having access to the rail channel, the reinforcement plate is usually welded to the rail within this channel. Hence, the plate must be precisely cut to fit within this designated area. Once the plate has been prepared, it must then be welded in place. There is no assurance that sufficient spot welds will be made to provide a good bond between the reinforcement plate and the rail. Moreover, the welding procedure is time-consuming and requires the additional skill of arc or mig welding on the part of the repair person. As will be appreciated by those skilled in the art, the welds promote corrosion of the metal parts and thus lead to a reduction in the integrity and life of the repaired members. A closure plate is then typically welded to the flanges of the stamping for further reinforcement which, with the channel, forms a closed space or cavity in which the metal reinforcement plate is housed.

In addition to these drawbacks, this prior art technique may change the dynamic performance of the reinforced structure during a subsequent collision. While, as stated, one goal of the repair procedure is to restore the strengthen and energy absorption characteristics of the structural member, the insertion of a metal plate in the rail may in fact reduce the energy absorption of the member or change the frame failure mode. This may result in the exertion of forces on vehicle components which were not designed to withstand these forces. Moreover, the repair procedure may not restore the original strength characteristics of the reinforced part. These factors may lead to catastrophic consequences during a subsequent collision.

In order to provide a method and device which compensates for these deficiencies of prior art repair methods, the environment in which these repairs are made must be carefully considered. While metal repair should be performed by skilled metal workers, it is often the case that many repair tasks are delegated to poorly trained personnel in neighborhood "bump shops." A lack of care in implementing any repair procedure can undermine the efficacy of the repair. Thus, a practical repair procedure must be simple to carry out and should reduce the discretion that is exercised by the repair person. Therefore, it is an object of the present invention to provide a system for reinforcing a structural member which is both simple and reliable.

It is a further object that such a system restore to the extent possible the original strength and energy absorption characteristics to a damaged structural member. It is still a further object of the present invention to provide a structural reinforcement which is both lightweight and strong. The present invention provides a process which achieves these goals by forming a reactive dough that expands in place in a hollow structural member to provide a solid, lightweight structural reinforcement.

SUMMARY OF THE INVENTION

The method of reinforcing a structural member comprises the steps of making a first composition having a dough-like consistency and the step of making a second dough-like composition. The first composition includes a mixture of a thermosetting resin and unexpanded microspheres. A filler material is also preferably included in the first composition in a quantity sufficient to yield the aforementioned dough-like consistency. The second composition includes a curing agent which is effective to cross-link and cure the thermosetting resin present in the first composition. The second composition also preferably contains a filler to impart the dough-like consistency and further preferably contains a quantity of a colorant sufficient to impart a uniform color to the second composition. This uniform color is preferably substantially different than the color of the first composition. The first and second compositions are preferably contained in separate chambers of a container where they remain relatively stable until they are mixed and used to reinforce a structural member.

By combining the first composition with the second composition, a third composition is formed which is chemically reactive by virtue of the effect of the curing agent in promoting the cross-linking or or curing of the thermosetting resin. The cross-linking of the thermosetting resin which is promoted by the curing agent is an exothermic reaction, and the heat of reaction which is evolved raises the temperature of the third composition which in turn further catalyzes the cross-linking reaction and causes the unexpanded microspheres to expand. Since the third composition is in a dough-like state when it is first formed by the blending together of the first and second compositions, expansion of the microspheres causes the dough to "rise," thereby increasing the volume of the third composition. As the cross-linking reaction continues, the thermosetting resin forms a cured, solid matrix in which the now-expanded microspheres and the filler are embedded, resulting in a rigid, lightweight reinforcement member. The provision of a colorant facilitates the blending of the first and second compositions together in that blending is complete when a uniform color is attained intermediate between the hues of the first and second compositions.

Thus, the method for reinforcing a hollow structural member includes the steps of preparing the aforementioned first composition and preparing the aforementioned second composition which are then blended to form the reactive dough of the third composition. The reactive or, more properly, "reacting" dough is packed into the cavity of a hollow structural member being reinforced. The two piece metal assembly is then welded together capturing the dough. The generation of heat during the polymerization of the thermosetting resin causes expansion of the unexpanded microspheres with concomitant increase in the volume of the dough. The expansion of the dough serves to further fill the cavity. As the thermosetting resin cures, it bonds to the surfaces of the structural member forming a uniform, rigid attachment. When the third composition has been transformed from its initial dough-like consistency to a fully-cured, hardened reinforcement member, it provides excellent strength and energy absorption characteristics to the structural member which it reinforces. In a preferred embodiment, the hollow structural member which is reinforced is one which has been damaged in a collision or the like.

In one embodiment, the thermosetting resin of the present invention is an epoxy resin to which unexpanded, thermally-expandable microspheres and a filler are added until a dough-like consistency is achieved. Similarly, a filler is added to a curing agent capable of promoting the cross-linking of an epoxy resin along with carbon black to produce a black dough-like composition. In this embodiment, the two doughs are blended together just prior to the reinforcement procedure to produce a reactive third dough which is gray in color. Where the present invention is used to reinforce a damaged rail member of a motor vehicle, the reactive gray dough is packed into the channel of the rail member, and a closure plate is preferably then welded in place across the channel. As the reactive gray dough expands as a result of the heat generated, which expands the thermally-expandable microspheres, the dough conforms to the shape of the cavity, contacting and bonding to the adjacent structures. Upon curing, a rigid, lightweight reinforcement is formed which is securely bonded in place.

The present invention will now be more fully explained in the following description of the preferred embodiments by which those skilled in the art will appreciate the method of making and using the present invention.

These and other meritorious advantages and features of the present invention will be more fully understood with reference to the following description of the preferred embodiments of the invention and in connection with the drawings in which:

DESCRIPTION OF THE PREFERRED EMBODIMENTS

Figure 1:
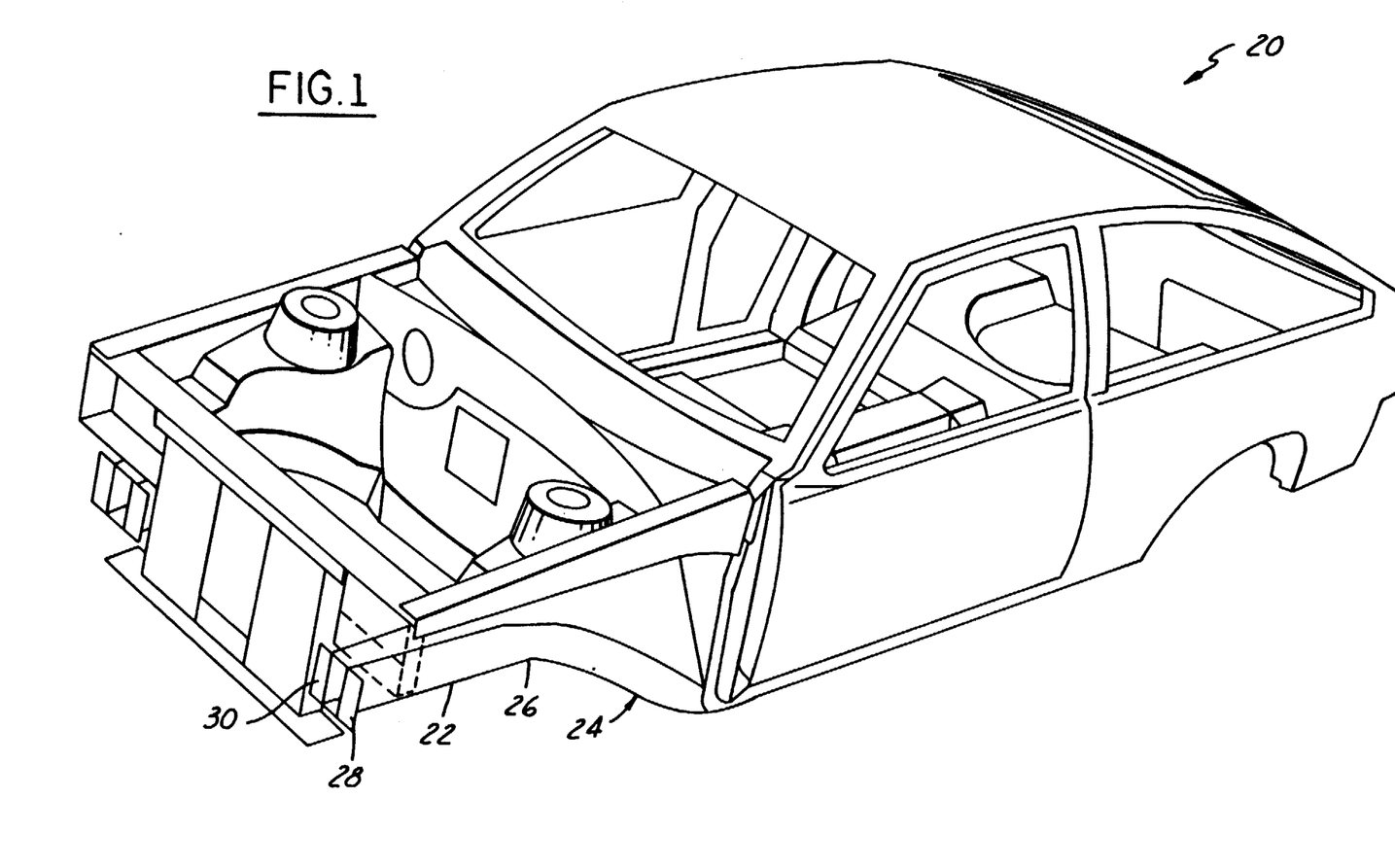
FIG. 1 is a perspective view of a portion of an automobile in which the front section of a frame side rail is exposed.

Referring now to FIG. 1 of the drawings, a typical motor vehicle 20 is shown with the front section 22 of frame side rail 24 being exposed. It will be assumed for the purposes of this discussion that motor vehicle 20 has been involved in a low-speed front-end collision and that side rail 24, which is typically formed of steel, sustained damage, for example, a crumpling or collapse of front section 22 in region 26. It will also be assumed that front section 22 has now been straightened using conventional frame-straightening techniques such as a frame machine. It will also be assumed that frame side rail 24 is constructed of two U-shaped stampings 28 and 30 welded together by means of a horizontal longitudinal joint or seam (not shown). Since region 26 has been plastically deformed during the collision and during the straightening process, its strength and energy absorption characteristics have been dramatically altered. It will also be noted that region 26 is a natural bend of frame side rail 24. Hence, reinforcement by the conventional method of attaching a metal plate is rendered even more difficult since a metal reinforcing plate would have to conform to the natural bend of region 26. However, the problems inherent in this prior art technique have been avoided by the repair of region 26 using the method and compositions of the present invention.

Figure 2:
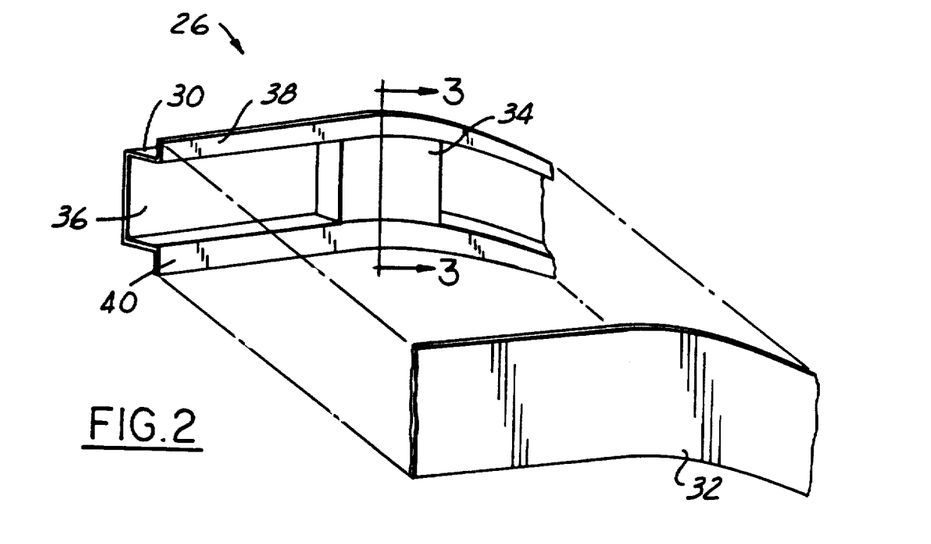
FIG. 2 is a U-shaped stamping of a side rail showing the composition of the present invention in place in the rail channel with a cover plate shown in exploded view.
Figure 3:
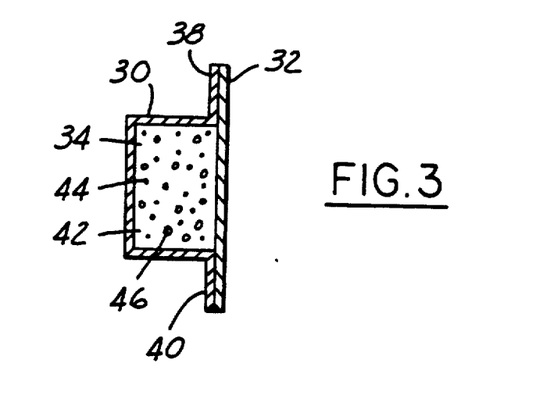
FIG. 3 is a cross-section along lines 3—3 of FIG. 2 with the closure plate in place.

Turning now to FIG. 2 of the drawings, an isolated view of region 26 of front section 22 is shown with U-shaped stamping removed and closure plate 32 illustrated as exploded from U-shaped stamping 30. Reinforcement member 34 is seen substantially filling a section of channel 36 and rigidly bonded to the inner surfaces of U-shaped channel 30. While closure plate 32 is shown removed from its attachment at flanges 38 and 40 of U-shaped member 30, in actuality, closure plate 32 is attached to U-shaped stamping 30 by spot welds at flanges 38 and 40 and by the rigid attachment of reinforcement member 34 to closure plate 32. This relationship is illustrated more clearly in FIG. 3 which is a cross-section along lines 3—3 of FIG. 2. There, closure plate 32 is shown welded in place on U-shaped stamping 30 at flanges 38 and 40. It can be seen that reinforcement member 34 completely occupies a portion of channel 36 in contact with the surrounding surfaces. Reinforcement member 34 is in its cured state such that it is a solid body comprising a cross-linked epoxy resin matrix 42 in which particles of filler 44 and expanded microspheres 46 are shown. It is important to point out that reinforcement member 34 is not shown to scale and that the sizes of the expanded microspheres 46 and filler particles 44 are greatly exaggerated for the purposes of illustration. A more detailed explanation of the compositional characteristics of reinforcement 34 will follow. In this manner, reinforcement member 34 serves to reinforce region 26 of frame side rail 24 such that during a subsequent, second collision, region 26 of frame side rail 24 will respond in a fashion closely similar to that of the original part.

Figure 4:
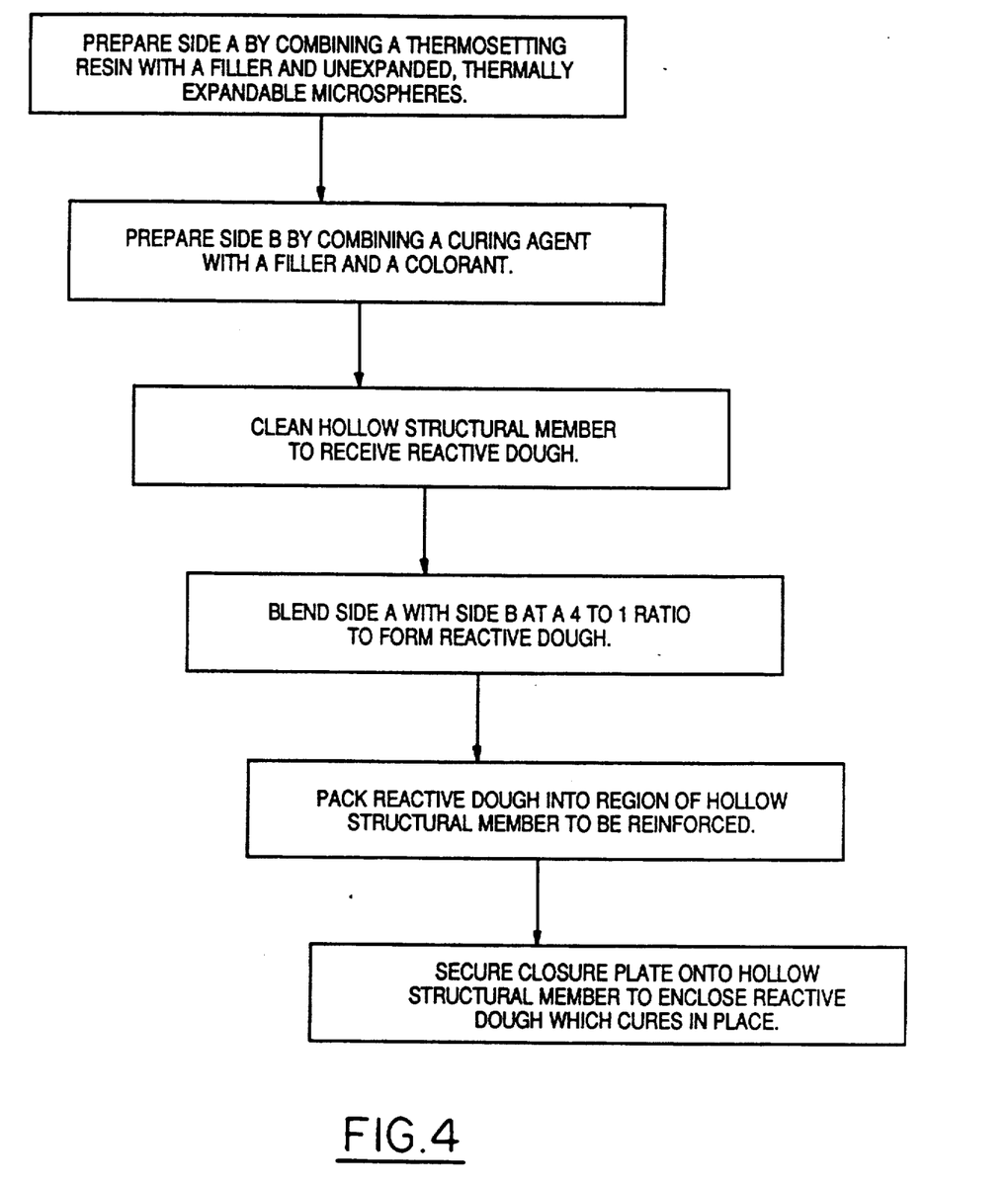
FIG. 4 is a flowchart illustrating the steps of the present invention.

Reinforcement member 34 is preferably formed in the following manner which constitutes the reinforcement repair process of the present invention. Referring now to FIG. 4 of the drawings, the first step of the procedure involves the preparation of the first composition or side A of the invention. Side or part A is prepared by slowly adding a filler and unexpanded, thermally-expandable microspheres to a liquid epoxy resin or prepolymer until a dough-like consistency is attained. The ingredients can be mixed in any convenient container using a conventional mixer, although undue shearing should probably be avoided. As will be more fully appreciated hereinafter, in the most preferred embodiment, side A, and side or part B, are provided premixed in the form of a two-part kit. The mixing or blending together of the ingredients to form side A can be carried out at ambient temperature and pressure with no unusual constraints on the process parameters.

The consistency of side A, as stated, is dough-like and can be compared to kneaded bread dough. The consistency of side A should be sufficiently firm, having enough body such that no substantial flow of the material takes place. It should not be in a true liquid or "runny" state. It should, however, be soft enough so that it can be easily kneaded or blended with side B without undue effort by the repair person. Accordingly, it is to be remembered that one of the significant advantages of the present invention is its ease of use.

The concentration or proportion of each ingredient of side A does not appear to be critical and may thus vary somewhat so long as the principles of the present invention are faithfully observed. The thermosetting resin component thus comprises from about 5% to about 99% by weight of side A, preferably from about 20% to about 90% by weight of side A, and most preferably from about 65% to about 85% by weight of side A. Any number of thermosetting resins may be suitable for use in the present invention, although epoxy resins are particularly preferred due to their excellent adhesion characteristics, rapid rate of curing, low-temperature curing characteristics, and the high strength exhibited by the fully cured resin. As will be appreciated by those skilled in the art, epoxy resins in the liquid state can be referred to as prepolymers in which the number of repeating units of the polymer is low enough such that the resin flows readily during preparation of side A. A number of epoxy resins may be suitable for use in formulating side A, including epoxy novolak resin, cycloaliphatic epoxide resin, aliphatic epoxy resin, and other similar epoxy resins. Most preferred is bisphenol A-epichlorohydrine resin. A suitable bisphenol A-epichlorohydrine resin is available under the trademark "Epi-Rez 510" from the Interez Corporation.

In addition to the aforementioned attributes, the preferred thermosetting resins of the present invention are both economical, have a low order of shrinkage on cure, produce no cure byproducts, and have chemical and environmental resistance. The chemistry and polymerization reactions or curing mechanisms of the epoxy resins are well understood and thus their preparation will not be detailed.

The unexpanded microspheres used in preparing side A of the present invention are preferably activated or expanded by thermal action. In addition to providing a lightweight reinforcement member due to their low density, the expandable microspheres function in the present invention as an expanding agent which, upon activation, causes the reactive dough of the present invention to "rise" or expand such that it fills the cavity in which it is disposed. By expanding in this manner, the reactive dough makes excellent contact with surrounding structures, filling any small voids and conforming to irregular surfaces. Unexpanded microspheres are generally organic in nature and may be obtained from a number of sources. The preferred unexpanded, thermally-expandable microspheres have an average diameter of approximately 5 microns to about 7 microns which increases to about 40 microns to about 60 microns upon expansion. The preferred beads are thermally activated by the heat generated in the exothermic polymerization reaction in which the thermosetting resin of side or part A thus should expand at temperatures between about 100 degrees C. to about 120 degrees C. Two particularly preferred types of unexpanded, thermally-expandable polyvinylidene chloride microspheres are those sold under the trademark "Expancel 551-DU" sold by the Expancel Corporation. Other equivalent expandable microspheres which are suitable for use in the present invention will be known to those skilled in the art. Unexpanded, thermally-expandable microspheres comprise from about 0.1% by weight to about 20% by weight, preferably from about 0.5% by weight to about 10% by weight, and most preferably from about 1% by weight to about 3% by weight of side A of the present invention.

In order to add bulk to the first composition, to extend the thermosetting resin, and to give the first composition its dough-like consistency, a filler is added along with the unexpanded, thermally-expanded microspheres. It is to be understood that the exact order in which the three components of part A are blended together is not critical, although it is preferred that the dry constituents, that is, the filler and unexpanded, thermally-expandable microspheres, be added slowly to the epoxy resin. Also, if the ranges set forth for the three constituents in a given case do not provide the optimum dough-like consistency, the viscosity of the dough is most easily adjusted by adjusting the amount of filler which is used.

A number of fillers are suitable for use herein, alone or in combination with one another, such as calcium carbonate, talc (hydrated magnesium silicate), and kaolinite (hydrated aluminum silicate). Various clays may be suitable. Other fillers which may be useful in the present invention include alumina trihydrate, feldspar (anhydrous alkali alumina silicate), and silica. Solid glass spheres could be used, although they are not necessarily beneficial in terms of density. Most preferred for use herein are hollow glass spheres, also known as glass bubbles or glass balloons, having an average diameter less than about 70 microns. These hollow glass microspheres are preferred due to their low density and high strength. While multicellular hollow microspheres may be suitable, the unicellular type are known to work well. Also, organic hollow microspheres may be a suitable filler. These hollow microspheres may be used in combination with mineral fillers to make up the total concentration of filler. Filler comprises from about 0.5% to about 90% by weight, preferably from about 5% to about 60% by weight and most preferably from about 20% to about 30% by weight of part A.

Referring again to FIG. 4 of the drawings, the next step of the present invention is the preparation of the second composition or part B. Part or side B includes a curing agent or hardener as the active agent which must be compatible with the thermosetting resin which is used to formulate part A. That is, the curing agent in part B must be capable of promoting cross-linking of the thermosetting resin which is used in the first composition. This is critical since the final reactive dough which is prepared by blending together part A and part B must undergo cross-linking to cure the thermosetting resin of part A. A number of curing agents will be known to those skilled in the art for this purpose. Both the nature of the curing agent and the concentration of curing agent used should in the final reactive dough promote a cross-linking reaction which is rapid and moderately exothermic to generate the heat necessary to expand the unexpanded, thermally-expandable microspheres. However, the rate of cure should not be so rapid that the reactive dough hardens before adequate time is allowed for it to be hand-packed into a hollow structural member. Therefore, and although this period may vary widely, it is preferred that the reactive dough which is formed by blending together part A and part B of the present invention should remain fairly dough-like for a period of about thirty minutes after blending. This period will be adequate on most occasions. Substantially full cure should be complete in about twenty-four hours.

Therefore, a curing agent is present in part B at a concentration of about 10% to about 90% by weight, preferably about 30% to about 85% by weight, and most preferably from about 60% to about 75% by weight of part B. Where the thermosetting resin of part A is an epoxy resin as preferred, suitable curing agents include aliphatic amines and aliphatic polyamines such as primary polyamines and secondary polyamines, and polyamides. Diethylenetriamine and triethylenetetramine are particularly preferred. A particularly preferred curing agent for use in part B where part A includes an epoxy resin is that sold under the trademark "Interez 826 Hardener" available from the Interez Corporation. "Interez 826 Hardener" is an aliphatic amine adduct partially reacted with an epoxy resin. Aliphatic amido amines such as "Epicure 856" also available from Interez Corporation may also be suitable.

Again, the second composition which is part or side B of the kit has a dough-like consistency similar to the consistency of part A. This is achieved by adding to the curing agent, preferably a liquid or a solution, a quantity of filler which is sufficient to raise the viscosity of part B to a dough-like consistency. The same considerations generally applicable to selecting a filler for part A are equally applicable for part B and the aforementioned list of fillers are acceptable. Due to their excellent durability and density characteristics, hollow glass microspheres are preferred for use as filler in part B. Particularly preferred are those hollow glass microspheres sold under the trademark "3M C15" by the 3M Company. Filler comprises from about 0.5% to about 90% by weight, preferably from about 10% to about 70% by weight, and most preferably from about 20% to about 40% by weight of part B. As stated, it is the attainment of the dough-like consistency rather than the specific concentration of filler which is important in formulating part B.

As previously explained, in order to simplify the process of determining when part A and part B have been uniformly mixed or blended together, a colorant is added to either part A or part B. It is preferred that the colorant be added to part B. The addition of the colorant to part B is preferred since, as will be shown, part A and part B are provided in the final reactive dough in a volumetric ratio of about four parts to about one part. That is, about four to five parts of part A are added to about one part of part B. By providing the colorant in the dough of lesser volume, more blending will generally be required to reach a uniform color which gives greater assurance of uniform mixing. The colorants which are preferred for use in the present invention can be either dyes or pigments and preferably comprise inorganic or organic pigment which is easily dispersible in part B. A number of hues are acceptable, but is preferred that black be used. Generally, the constituents of part A when mixed will provide a white dough. Thus, by coloring part B black, uniform blending is achieved when the reactive dough is uniformly gray. Thus, dyes such as nigrosines, for example, solvent black 5 or solvent black 7 may be used, and most preferably carbon black is used as the colorant in part B. Preferred are thermal and furnace blacks which are outstanding colorants and which also protect the final reinforcement structure from ultraviolet degradation. The quantity of colorant which is used is that amount sufficient to uniformly color part B. Typically, from about 0.05% to about 10% by weight, preferably from about 0.1% to about 3% by weight and most preferably from about 0.5% to about 1.0% by weight of part B is added to part B as the colorant.

The mixing sequence for part B is not critical, although it will usually include the slow addition of filler and carbon black to a liquid curing agent which is stirred and then kneaded to its dough-like consistency.

A number of other ingredients can be used to further enhance the properties of the present invention. For example, a coupling agent can be added to part A to modify the interface of the thermosetting resin matrix and an inorganic filler such that a more solid structure is attained. A coupling agent where utilized would typically be included in part B, that is, the second composition. Suitable coupling agents include silanes such as gama-chloropropyl-trimethoxysilane or tritanates such as isopropyl-tri(dioctylpyrophosphate)titanate. Certain accelerators may be useful in part B to increase the activity of the curing agent in promoting cross-linking of the thermosetting resin.

Other additives such as anti-oxidants or fibrous reinforcement materials may be useful. Suitable fibrous reinforcements may include chopped aramid fibers, chopped carbon fibers, chopped glass strains and milled glass fibers. The concentrations of these materials may vary so long as the desired durability of the final reinforcement member, workability of the reactive dough and the other objects of the present invention are achieved.

Referring now to FIGS. 2 and 4 of the drawings, region or section 26 is prepared for reinforcement by the present invention in the following manner. First, cavity or channel 36 is exposed such that reinforcement member 34 can be formed in place. Thus, the next step of the present invention is the preparation of the hollow structural member to receive the reactive dough. As stated, although the present invention is suitable for use in reinforcing plastic structural members, it is anticipated that the primary application of the present invention will be for use in reinforcing metal hollow structural members which have been damaged, such as in a collision. The surfaces of U-shaped stamping 30, which will be in contact with reinforcement member 34, are cleaned for good contact and adhesion by the reactive dough. This cleaning process may include blowing off excess dirt and dust and preferably includes a brief wash with acetone or alcohol. Preferably, rust and any weld scale present should be removed. Once the surface of U-shaped stamping 30 has been prepared, the reactive dough will be used to form reinforcement member 34 as prepared.

Figure 5:
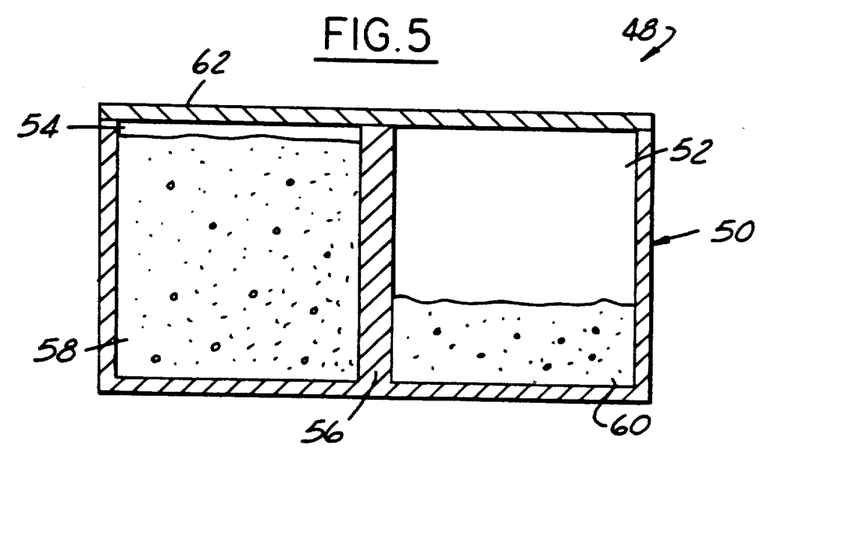
FIG. 5 is a cross-sectional elevational view of the kit of the present invention showing side A and side B of the reinforcement composition housed in separate cavities.

As stated, it is contemplated that the present invention will be made available as a kit and, referring now to FIG. 5 of the drawings, kit 48 is shown comprising container 50 having receptacles or cavities 52 and 54. Receptacles 50 and 54 are separated by partition 56. Container 50 is constructed of a material which is substantially non-reactive with respect to its contents. Receptacle 54 houses the first composition or part A 58 which is the thermosetting resin dough composition. Receptacle 52 contains part B 60 which is the curing agent dough composition. Substantially air-tight lid 62 is also provided.

In order to prepare the reactive dough, part A 58 and part B 60 are blended together uniformly. For the preferred compositions of part A 58 and part B 60, the two parts are blended together in the approximate ratio of between about four parts part A to about one part B in parts by volume and five parts A to about one part B in parts by volume. That is, the volume of part A 58 which is blended with part B 60 is approximately four time greater than the volume of part B 60. Since part B 60 includes a colorant, preferably carbon black, uniformity of blending of part A and part B can be observed once the combined or blended reactive dough has a uniform gray color. It should be pointed out that it may be desirable to add a pigment to part A such as titanium oxide if the ingredients of part A yield a dough which is not white. Once part A and part B are blended together to form the reactive dough, a number of physical and chemical changes occur. As the curing agent contacts the thermosetting resin, the polymerization or cross-linking of the thermosetting resin is promoted in the process of curing the thermosetting resin. As the thermosetting resin cures, the reactive dough will become even more viscous. The unexpanded, thermally-expandable microspheres, which are now uniformly distributed throughout the reactive dough, will begin to expand in response to the heat generated during the exothermic cross-linking reaction. This expansion of the expandable microspheres causes the reactive dough to rise or expand. Thus, the next step of the invention is the packing of the reactive dough into cavity 36 in contact with U-shaped stamping 30 in region 26 to be reinforced.

Both the blending of part A and part B to form the reactive dough and the packing of the reactive dough into channel 36 are preferably performed by hand, although it may be possible to automate this procedure. When hand-blending and hand-packing, the repair person should use solvent-resistant gloves or the like so that direct contact between the reactive dough and the repair person's hands is not made. As stated, the preferred compositions of the present invention produce a reactive dough which can be easily worked by hand for approximately thirty minutes, during which time the reactive dough continually rises or expands. The reactive dough should be packed into cavity 36 such that the area or region 26 to be reinforced is substantially filled. Once the reactive dough has been packed into cavity 36, it is preferred that closure plate 32 be welded onto U-shaped stamping 30 such that the reactive dough is enclosed in cavity or channel 36. This may be accomplished most readily by spot welding closure plate 32 at flanges 38 and 40. It may be desirable to increase the rate of curing and expansion of the reactive dough by heating region 26 of U-shaped member 30 with a heat gun or the like prior to packing the reactive dough into channel 36. The heat energy will not only increase the rate of the cross-linking reaction of the thermosetting resin, but also will increase the rate at which the thermally-expandable microspheres expand. Also, the heat generated during the welding, such as mig welding, of closure plate 32 on U-shaped stamping 30 at region 26 generally also heats the reactive dough, enhancing its cure rate. As the reactive dough expands, it fills any small cracks, voids, or surface irregularities in region 26 of U-shaped stamping 30 and bonds by adhesion to U-shaped stamping 30 and closure plate 32. In approximately twenty-four hours, the reactive dough has substantially fully cross-linked and the thermally-expandable microspheres have substantially fully expanded such that reinforcement member 34 shown in FIG. 2 is formed. Thus, the last step of the invention is the attachment of closure plate 32 after which the reactive dough cures to form reinforcement member 34.

Reinforcement member 34 has good strength and energy absorption characteristics and in most instances will restore the original characteristics of the damaged part which has been repaired and reinforced by the present invention. Due to the compositional characteristics of reinforcement member 34, and due to its expansion in channel 36, acoustical dampening is achieved which eliminates any rattle or the like by cover plate 32. A mating section of U-shaped stamping 28 may then be welded onto cover plate 32 if desired. Reinforcement member 34 also provides good corrosion resistance which is a significant problem in prior art metal plate reinforcing techniques. In addition, a heat lamp or the like may be employed to facilitate the cure of the reactive dough and expansion of the microspheres, if desired.

The present invention may be used to reinforce hollow sections other than vehicle frames or the like, including boat hulls or other structures where a lightweight, strong reinforcement is desired or in automotive roof structures such as the pillars. Kit 48 is both convenient and easy to implement and requires no complex mixing of hazardous materials nor does it require exact measurements or temperature ranges to be observed.

While a particular embodiment of this invention is shown and described herein, it will be understood, of course, that the invention is not to be limited thereto since many modifications may be made, particularly by those skilled in the art, in light of this disclosure. It is contemplated therefore by the appended claims to cover any such modifications as fall within the true spirit and scope of this invention.

The following example further illustrates the method of making and using the present invention and is not intended to in any way limit the scope of this invention.

EXAMPLE

A two-part system was prepared in accordance with the procedures and parameters set forth in the foregoing description of the preferred embodiments as follows. "3M C15" microspheres and "Expancel 551-DU" were added slowly to "Interez 510" epoxy, and the composition was stirred and then kneaded to a dough-like consistency. This was carried out at ambient temperature and pressure to yield a dough-like composition or part A having the following compositional make-up:

| Part A | |
|---|---|
| Interez 510 Epoxy | 73.0 parts by weight |
| 3M C15 Microspheres | 25.5 parts by weight |
| Expancel 551-DU | 1.5 parts by weight |

Part A was then placed in a closed container for later use.

Part B was prepared, again at ambient temperature and pressure, by slowly adding 3M C15 microspheres and carbon black to "Interez 826" hardener. The ingredients were mixed and then kneaded to a dough-like consistency. Part B had the following compositional make-up:

| Part B | |
|---|---|
| Interez 826 Hardener | 69.4 parts by weight |
| 3M C15 Microspheres | 30.0 parts by weight |
| Carbon Black | 0.6 parts by weight |

The dough-like part B was then placed in a closed container for subsequent use.

Four parts by volume of part A were then blended by kneading with one part by volume of part B until the reactive dough so formed had a uniform gray appearance. The kneading process took only a few minutes, and the reactive dough was then packed into a C-section to be reinforced. The channel of the C-section was then closed with a closure plate, and the dough was allowed to rise in place. In approximately twenty-four hours, the reactive dough had fully cured to form a reinforcement member. The reinforced C-section exhibited good strength characteristics.

What is claimed is:

1. A method of preparing a composition for use in reinforcing a hollow structural member comprising the steps of:

combining a liquid thermosetting resin, a first filler and unexpanded, thermally-expandable microspheres;

blending said combination of said thermosetting resin, said first filler and said unexpanded, thermally-expandable microspheres to form a first dough;

the first dough including from about 5 to 99 percent by weight of the thermosetting resin, from about 0.1 to about 20 percent by weight of the unexpanded thermally-expandable microspheres and from about 0.5 to about 90 percent by weight of the first filler to provide a doughy consistency to the first dough;

combining a liquid curing agent, a colorant, and a second filler; and blending said combination of said liquid curing agent, said colorant and said second filler to form a second dough;

the second dough including from about 10 to about 90 percent by weight of the curing agent adapted to promote cross-linking polymerization of the thermosetting resin in an exothermic reaction, and from about 0.5 to about 90 percent by weight of the second filler to provide a doughy consistency to the second dough.

2. The method of preparing a composition for use in reinforcing a hollow structural member recited in claim 1, wherein said thermosetting resin is an epoxy resin and said curing agent includes means for curing said epoxy resin.

3. The method of preparing a composition for use in reinforcing a hollow structural member recited in claim 1, wherein said first and second fillers are selected from the group consisting of calcium carbonate, hydrated magnesium silicate, kaolinite, alumina trihydrate, anhydrous alkali alumina silicate, silica, solid glass spheres, hollow glass spheres and combinations thereof.

4. The method of preparing a composition for use in reinforcing a hollow structural member recited in claim 1, wherein said thermosetting resin is bisphenol A-epichlorohydrin resin.

5. The method of preparing a composition for use in reinforcing a hollow structural member recited in claim 1, wherein said colorant is carbon black.

6. The method of preparing a composition for use in reinforcing a hollow structural member recited in claim 1, wherein said curing agent is selected from the group consisting of aliphatic amines and polyamides.

7. A method of reinforcing a structural member having a cavity comprising the steps of:

preparing a first dough which includes a thermosetting resin, a first filler and unexpanded, thermally-expandable microspheres;

the first dough including from about 5 to 99 percent by weight of the thermosetting resin, from about 0.1 to about 20 percent by weight of the thermally-expandable microspheres and from about 0.5 to about 90 percent by weight of the first filler to provide a doughy consistency to the first dough;

preparing a second dough which includes a curing agent, a colorant and a second filler;

the second dough including from about 10 to about 90 percent by weight of the curing agent adapted to promote cross-linking polymerization of the thermosetting resin in an exothermic reaction, and from about 0.5 to about 90 percent by weight of the second filler to provide a doughy consistency to the second dough;

blending together said first dough and said second dough to form a reactive third dough; and packing said reactive third dough in said cavity of said structural member;

wherein said curing agent promotes the cross-linking of said thermosetting resin in a reaction which releases heat, wherein said heat of said reaction causes said unexpanded, thermally-expandable microspheres to expand such that said reactive dough expands, and wherein said cross-linking of said thermosetting resin continues until said thermosetting resin substantially cures to form a rigid body which adheres to and reinforces said structural member.

8. The method of reinforcing a structural member recited in claim 7, wherein said hollow structural member is a motor vehicle component.

9. The method of reinforcing a structural member recited in claim 7, wherein said structural member is a repaired section of a motor vehicle frame.

10. The method of reinforcing a structural member recited in claim 7, further including the step of providing a closure plate and attaching said closure plate to said structural member to enclose said reactive dough in said cavity.

11. The method of reinforcing a structural member recited in claim 7, further including the step of cleaning said structural member in the region where said reactive dough is packed into the cavity of said structural member.

12. The method of reinforcing a structural member recited in claim 7, wherein said thermosetting resin is an epoxy resin and wherein said curing agent includes means for curing said epoxy resin.

13. The method of reinforcing a structural member recited in claim 7, wherein said first and second fillers are selected from the group consisting of calcium carbonate, hydrated magnesium silicate, kaolinite, aluminum trihydrate, anhydrous alkali aluminum silicate, silica, solid glass spheres, hollow glass spheres and combinations thereof.

14. The method of reinforcing a structural member recited in claim 7, further including the step of heating said structural member with heating means before said packing step.

15. The method of reinforcing a structural member recited in claim 7, further including the step of heating said reactive dough and said structural member after said reactive dough has been packed into said structural member to enhance the cure rate of said reactive dough.

* * * * *